United States Patent

Nakanishi et al.

Patent Number: 5,837,644
Date of Patent: Nov. 17, 1998

[54] SURFACE HYDROPHOBIC ACTIVE CARBON AND METHOD FOR PRODUCTION THEREOF

[75] Inventors: Yoichiro Nakanishi; Takako Honjoh, both of Ikeda; Kuniaki Honjo, Ibaraki, all of Japan

[73] Assignees: Agency of Industrial Science & Technology; Ministry of International Trade & Industry, both of Tokyo, Japan

[21] Appl. No.: 712,602

[22] Filed: Sep. 13, 1996

[30] Foreign Application Priority Data

Sep. 14, 1995 [JP] Japan .................................. 7-262359

[51] Int. Cl.⁶ ...................................... B01J 20/02
[52] U.S. Cl. ...................... 502/416; 423/445; 423/447.1; 423/447.2; 423/460; 502/180
[58] Field of Search ...................... 502/182, 417, 502/427, 180; 423/265, 460, 445, 447.1, 447.2

[56] References Cited

U.S. PATENT DOCUMENTS

| | | | |
|---|---|---|---|
| 4,838,946 | 6/1989 | Yamaguchi et al. | 134/7 |
| 4,978,650 | 12/1990 | Coughlin et al. | 423/460 |

FOREIGN PATENT DOCUMENTS

| | | |
|---|---|---|
| 20 42 729 | 3/1972 | Germany . |
| 55041848 | 9/1978 | Japan . |

OTHER PUBLICATIONS

Shikizai Kyokaishi, vol. 62., No. 1, pp. 2–7, 1989.
Grazyna Wojcik, et al., Chemi. Stosow, vol. 22, No. 2, pp. 351–360, 1978 Effect of modification of activated carbons with trimethylchlorosilane and dimethyl sulfoxide on absorption properties with respect to water vapor and ethanol.
Grazyna Wojcik, et al., Chemi. Stosow, vol. 22, No. 2, pp. 351–360, 1978, "Effect of Modification of Activated Carbons with Trimethylchlorosilane and Dimethyl on Adsorption Properties with Respect to Water Vapor and Ethanol".
Chemical Abstracts, vol. 112, No. 22, AN–205358, May 28, 1990.

(List continued on next page.)

Primary Examiner—Wayne Langel
Attorney, Agent, or Firm—Oblon, Spivak, McClelland, Maier & Neustadt, P. C.

[57] ABSTRACT

A surface hydrophobic active carbon is disclosed which has undergone a treatment with trimethyl chlorosilane and exhibits a silicon concentration on the surface thereof, $Si_{2p}/C_{1s}$, in the range of 0.005–0.03 as determined by X-ray photoelectron spectroscopy and a humidity for starting adsorption of water in the range of 45–60% as determined from the equilibrium adsorbed water content curve, and a method for the production of a surface hydrophobic active carbon is disclosed which comprises exposing active carbon to trimethyl chlorosilane, allowing the exposure to continue for a prescribed length of time, evacuating the ambience, thereby removing excess amount of trimethyl chlorosilane, and subsequently heating the active carbon under a vacuum.

4 Claims, 1 Drawing Sheet

OTHER PUBLICATIONS

Database WPI, Derwent Publications, AN —80–33396C, JP–A–55 041 848, Mar. 25, 1980.

Patent Abstracts of Japan, vol. 4, No. 50, Apr. 16, 1980, JP–A–55 023039, Feb. 19, 1980.

Chemical Abstracts, vol. 123, No. 12, AN–146573, Sep. 18, 1995, JP–7–145516, Jun. 6, 1995.

Chemical Abstracts, vol. 117, No. 14, AN–133846, Oct. 5, 1992, JP–4 171043, Jun. 18, 1992.

1992 Report of Special Study of Environmental Pollution, pp. 52–III–1 to 52–III–13, Sep. 1993, Y. Nakanishi, et al., "Research on Landwater Quality Protection From Hazardous Organic Compounds" (with partial English translation).

1993 Report of Special Study of Environmental Pollution, pp. 49–III–1 to 49–III–9, Sep. 1994, Y. Nakanishi, et al., "Research on Landwater Quality Protection From Hazardous Organic Compounds" (with partial English translation).

1994 Report of Special Study of Environmental Pollution, pp. 49–III–1 to 49–III–9, Sep. 1995, Y. Nakanishi, et al., "Research on Landwater Quality Protection From Hazardous Organic Compounds" (with partial English translation).

The Present Condition of the Pollution of Underground Water and Soil, and Countermeasure Thereto, 1995, pp. 201–208, "Modification of Active Carbon Film and Its Adsorption Characteristics" (with partial English translation).

Tanso, No. 164, pp. 199–215, 1994, Y. Nakanishi, et al. "Effect of Surface Treatment on the Mechanical Properties of Activated Carbon Fiber" (with partial English translation).

Surface, vol. 29, No. 6, pp. 448–459, 1991, "Surface Modification of Carbon Type Adsorbent and Adsorption Characteristics".

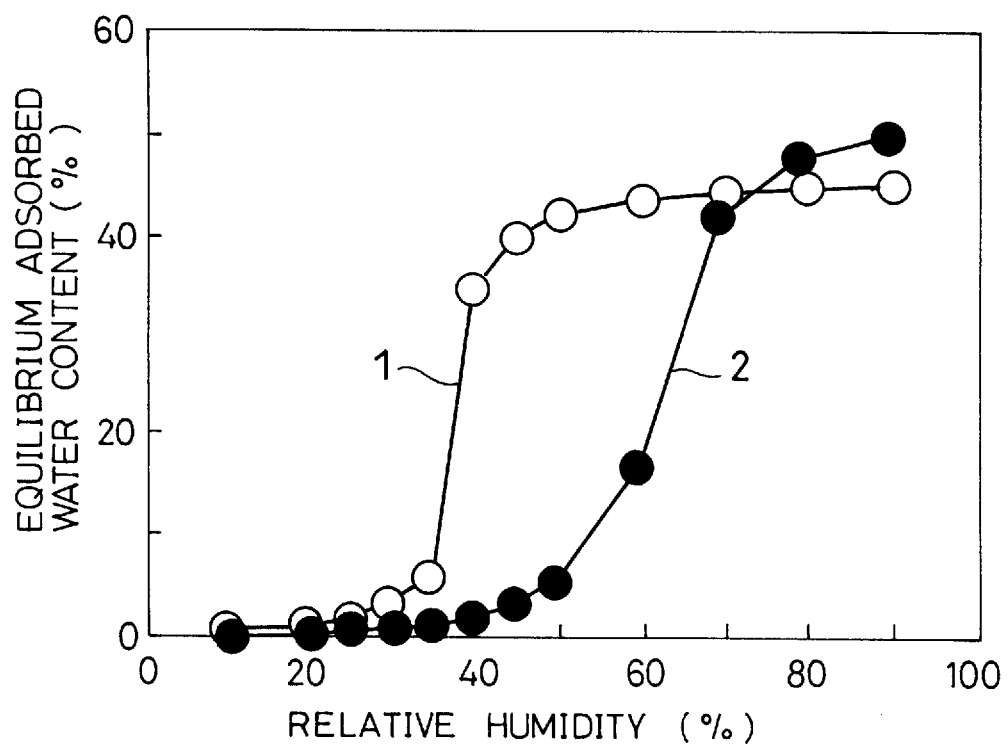

SURFACE HYDROPHOBIC ACTIVE CARBON AND METHOD FOR PRODUCTION THEREOF

BACKGROUND OF THE INVENTION

1. Field of the Invention

This invention relates to a surface hydrophobic active carbon and a method for the production thereof. The surface hydrophobic active carbon of this invention is useful, for example, as a high-performance adsorbent for purifying groundwater or the like polluted with a highly volatile organochlorine compound by adsorption of the pollutant.

2. Prior Art Statement

Advanced industrial technologies and improved cleaning techniques have led to use of increasingly large amounts of organochlorine compounds such as trichloroethylene as detergents. At the same time, increasingly large amounts of expended detergents of this type have come to infiltrate the ground and pollute the groundwater to the extent of raising a social issue. Polluted groundwater has been chiefly purified by the method of aeration. This method merely substitute air pollution for water pollution.

Under the circumstances, a need is felt for a new technique which allows efficient removal of pollutants such as organochlorine compounds from water. The removal of pollutants from water has been generally implemented by the method of adsorptive removal by the use of such active adsorbents as granular active carbon (GAC) and active carbon fibers (ACF), for example. Since these active carbon type adsorbents do not show very high capacities for the adsorption of organochlorine compounds, the method relying on these active carbon type adsorbents has the disadvantage of requiring the saturated adsorbents to be replaced or regenerated within short spans of time.

In general, active carbon has a hydrophobic surface. However, hydrophilic groups such as hydroxyl group and carboxyl group produced by activation in the process of the active carbon production are present on the surface of the active carbon. When such active carbon is to be used in water for the adsorption of an organochlorine compound which is a hydrophobic substance, the adsorption to the surface of the active carbon turns out to be a competitive reaction between water and the organochlorine compound. Thus, the active carbon does not adsorb the organochlorine compound when it has an excessively hydrophilic surface. In contrast, when the active carbon has an excessively hydrophobic surface, it repels water and consequently cannot easily adsorb the organochlorine compound dissolved in water. It is therefore clear that for efficient adsorption of an organochlorine compound in water, active carbon must be imparted with an appropriate degree of hydrophobicity.

Means available for making the surface of active carbon or active carbon fibers (hereinafter referred to collectively as "active carbon") hydrophobic include a method which heats active carbon in an inert ambience and a method which heats active carbon in a stream of hydrogen [Keizo Ogino, "Surface Modification of Carbon Type Adsorbent and Adsorption Characteristics," Surface, Vol. 29, No. 6, 448 (1991)]. These methods heat active carbon to high temperatures exceeding 600° C. and consequently consume a large amount of energy. They are therefore costly.

It is, therefore, a main object of this invention to provide a technique for imparting appropriate hydrophobicity to the surface of active carbon or active carbon fibers, thereby increasing the ability of the active carbon to adsorb an organochlorine compound contained in groundwater or the like and enabling the active carbon to effect efficient purification of polluted groundwater. Terms such as "surface hydrophobicity" used with respect to this invention refer to the hydrophobicity of not only the visible surface of active carbon but also to all other regions of active carbon including the surface of pores in the beads of active carbon.

It is another object of this invention to provide a technique for economically producing hydrophobic active carbon useful as an adsorbent for an organochlorine compound by a simple apparatus at low temperatures in the approximate range of room temperature to 100° C.

The present inventors continued a study with a view to attaining the objects mentioned above and found that these objects are substantially accomplished by treating active carbon with trimethyl chlorosilane, thereby imparting the surface of active carbon with appropriate hydrophobicity. This invention was accomplished as a result.

SUMMARY OF THE INVENTION

This invention specifically provides surface hydrophobic active carbon having undergone a treatment with trimethyl chlorosilane and exhibiting a silicon concentration on the surface, $Si_{2p}/C_{1s}$, in the range of 0.005–0.03 as determined by X-ray photoelectron spectroscopy and a relative humidity for starting adsorption of water in the range of 45–60% as determined from the equilibrium adsorbed water content curve.

It also provides a method for the production of the surface hydrophobic active carbon mentioned above by exposing active carbon to trimethyl chlorosilane, allowing the exposure to continue for a prescribed length of time, evacuating the reaction system thereby removing excess trimethyl chlorosilane therefrom, and then heating the active carbon under a vacuum.

The surface hydrophobic active carbon of this invention exhibits an adsorption coefficient in Freundrich adsorption equation, k, with respect to an organochlorine compound of at least 210 as determined by the adsorption isotherm.

In contrast, the magnitude of κ of untreated active carbon is not more than 100.

BRIEF DESCRIPTION OF THE DRAWING

The drawing shows the equilibrium adsorbed water content curve of raw material active carbon fibers and treated surface hydrophobic active carbon fibers obtained in Example 1.

DESCRIPTION OF THE PREFERRED EMBODIMENTS

The method for imparting hydrophobicity to active carbon according to this invention is a new method different from the aforementioned methods that employ a heat treatment performed in an inert ambience or in a stream of hydrogen. It does not require any heat treatment using a high temperature exceeding 600° C. or consumption of a large amount of energy. It is performed by a simple procedure and proves economical.

This invention imparts appropriate hydrophobicity to the surface of active carbon or active carbon fibers by exposing the active carbon or active carbon fibers to vapor or solution of trimethyl chlorosilane. The surface hydrophobic active carbon thus obtained is markedly improved in ability to adsorb an organochlorine compound.

The invention does not particularly limit the active carbon used by the kind or form of the raw material thereof.

Specifically, the active carbon may be derived from any raw material for active carbon such as, for example, coal type, petroleum type, PAN type, and other organic material type. The form of the active carbon may be any of the known forms such as, for example, granule, powder, fiber (active carbon fiber), and cloth produced from active carbon fibers.

The treatment of the active carbon with vapor of trimethyl chlorosilane is initiated by tightly sealing active carbon in a container, decompressing the interior of the container, introducing the vapor of trimethyl chlorosilane into the container, and allowing the introduced trimethyl chlorosilane to stand in the container and react on the active carbon for a length of time necessary for imparting to the active carbon such an amount of trimethyl chlorosilane as is required for producing a prescribed hydrophobicity (which is not particularly limited but is generally in the approximate range of 30 minutes to two hours). Then, the treatment is continued by decompressing the container to below 0.1 torr, thereby removing the vapor of trimethyl chlorosilane, elevating the temperature of the active carbon to a level in the approximate range of 80°–150° C., holding the active carbon at this temperature for a period in the range of 20–40 minutes, introducing an inert gas such as argon into the container, once more decompressing the container to below 0.1 torr, and finally extracting the treated active carbon from the container comprised with the inert gas such as argon. The expulsion of trimethyl chlorosilane by decompression is repeated two to four times when the active carbon has a dense texture or the amount of the active carbon is large.

The treatment of the active carbon with solution of trimethyl chlorosilane is initiated by dissolving trimethyl chlorosilane in an oleophilic solvent such as benzene, toluene, cyclohexane, hydrofuran, or ether to a concentration in the approximate range of 5–20%, and immersing the active carbon in the resultant solution. The period of this immersion is such as is necessary for imparting to the active carbon trimethyl chlorosilane in an amount required for producing a prescribed hydrophobicity (which is not particularly limited but is generally in the approximate range of 30–120 minutes). Then, the treatment is continued by placing the treated active carbon in a sealed container, decompressing the interior of the container thereby removing trimethyl chlorosilane and the benzene or other solvent, then elevating the temperature of the active carbon to a level in the approximate range of 80°–150° C., allowing the active carbon to stand at that temperature for a period in the approximate range of 20–40 minutes, introducing an inert gas such as argon into the container, lowering the inner temperature of the container to room temperature, and extracting the treated active carbon from the container.

The surface hydrophobic active carbon according to this invention exhibits a silicon concentration on the surface, $Si_{2p}/C_{1s}$, in the range of 0.005–0.03 as determined by X-ray photoelectron spectroscopy and a humidity for starting adsorption of water in the range of 45–60% as determined from the equilibrium adsorbed water content curve.

The characteristics mentioned above will now be explained in detail.

When the $Si_{2p}/C_{1s}$ is less than 0.005, the amount of trimethyl silyl group introduced is unduly small and the hydrophilicity is unduly strong. Conversely, when the $Si_{2p}/C_{1s}$ exceeds 0.03, the amount of trimethyl silyl group introduced is unduly large and the hydrophobicity is unduly strong. When the humidity for starting adsorption is less than 45%, the hydrophilicity is unduly strong. If this humidity exceeds 60%, the hydrophobicity is unduly strong. An active carbon which exhibits an $Si_{2p}/C_{1s}$ in the range of 0.005–0.03 and a humidity for starting adsorption in the range of 45–60% adsorbs a very large amount of a harmful organochlorine compound contained in water.

Thus, the surface hydrophobic active carbon of this invention exhibits excellent characteristics from the practical point of view.

The adsorption constant, κ, of the surface hydrophobic active carbon of this invention determined in accordance with the adsorption isotherm obtained of such harmful organochlorine compounds as trichloroethylene, tetrachloroethylene, trichloro-ethane, dichloroethylene, vinyl chloride, chloroethane, and trihalomethane is not less than 210. The adsorption constant, κ, of untreated active carbon (not imparted with hydrophobicity) is not more than 100. This fact clearly indicates that the constant, κ, is increased by the treatment for the impartation of hydrophobicity.

Active carbon treated by the method of this invention shows no change in appearance. Active carbon fibers treated by the method of this invention show no discernible sign of decline in tensile strength. The treatment is found to bring about only a slight decline in specific surface area.

Now, the features of this invention will now be further elucidated with reference to working examples.

EXAMPLE 1:

A sample container was charged with 1 g of active carbon fibers A (derived from coal pitch), evacuated, and then charged with vapor of trimethyl chlorosilane. The container was left standing at room temperature for one hour and was then evacuated to remove the vapor of trimethyl chlorosilane. Subsequently, it was heated to 100° C. while maintaining the evacuated condition, kept at this temperature for 30 minutes, then charged with argon gas, evacuated again, allowed to cool to room temperature, and charged with argon gas. The container was filled with argon gas, and then the sample was taken out from it. The ratio of increase in the weight of the sample due to this treatment was 4.7%. The sample consequently obtained was surface hydrophobic active carbon fibers.

The equilibrium adsorbed water content curves of the active carbon fibers used in this example and surface hydrophobic active the carbon fibers after the treatment of this invention are shown in the attached drawing. In the drawing, the vertical axis represents equilibrium adsorbed water content (%) and the horizontal axis represents relative humidity (%). Curve 1 was plotted from data on the untreated active carbon fibers and curve 2 from data on the surface hydrophobic active carbon fibers obtained by the treatment in Example 1.

The humidity for starting adsorption on the active carbon fibers determined based on the equilibrium adsorbed water content curves rose from 32%, the magnitude before the treatment, to 58%, the magnitude after the treatment.

The adsorption constant, κ, of trichloroethylene in water rose from 93, the magnitude before the treatment, to 217, the magnitude after the treatment.

Table 1 shows the physical properties of the active carbon fibers before and after the treatment and Table 2 the adsorption characteristics thereof before and after the treatment.

EXAMPLE 2:

A sample container was charged first with 2 g of active carbon fibers B (derived from phenol resin) and then with a benzene solution of 10 mol% trimethyl monochlorosilane, and left standing at room temperature for one hour. The liquid in the sample container was then discharged. Another closed container was charged with the treated sample B, subjected to the procedure of Example 1 to remove trimethyl chlorosilane and benzene, and finally filled with argon gas, whereafter the sample B was taken out. In this case, the ratio of increase in the weight due to the treatment was found to be 1.3%.

The humidity for starting adsorption on the active carbon fibers determined based on the equilibrium adsorbed water content curves rose from 40%, the magnitude before the treatment, to 45%, the magnitude after the treatment.

The adsorption constant, κ, of trichloroethylene in water rose from 50, the magnitude before the treatment, to 218, the magnitude after the treatment.

The surface of the active carbon treated with trimethyl monochlorosilane was examined by X-ray photoelectron spectroscopy. When the condition of linkage of silicon atoms to the surface of the active carbon was examined based on the $C_{1s}$ peak, it was found that Si was linked with the siloxane.

Table 1 shows the physical properties of the active carbon fibers before and after the treatment and Table 2 the adsorption characteristics thereof before and after the treatment.

TABLE 1

|  | Tensile strength (MPa) | Specific surface area (m²/g) | Pore diameter peak (Å) |
|---|---|---|---|
| Example 1 |  |  |  |
| No treatment | 59.0 | 1.138 | 13 |
| Treatment in gaseous phase | 58.3 | 1.050 | 11 |
| Example 2 |  |  |  |
| No treatment | 93.0 | 1.140 | 13 ~ 15 |
| Treatment in liquid phase | 93.2 | 1.099 | 11> |

TABLE 2

|  | Relative humidity for starting water adsorption (%) | Adsorption constant κ | $Si_{2p}/C_{1s}$ | $O_{1s}/C_{1s}$ |
|---|---|---|---|---|
| Example 1 |  |  |  |  |
| No treatment | 32 | 93 | 0 | 0.111 |
| Treatment in gaseous phase | 58 | 217 | 0.007 | 0.132 |
| Example 2 |  |  |  |  |
| No treatment | 40 | 50 | 0 | 0.107 |
| Treatment in liquid phase | 45 | 216 | 0.031 | 0.243 |

TABLE 2-continued

|  | Relative humidity for starting water adsorption (%) | Adsorption constant κ | $Si_{2p}/C_{1s}$ | $O_{1s}/C_{1s}$ |
|---|---|---|---|---|

Note: The relative humidity for starting adsorption of water in Table 2 was determined based on the equilibrium adsorbed water content curves.

This invention permits easy impartation of hydrophobicity to the surface of active carbon by a simple procedure without requiring consumption of a large amount of energy.

As demonstrated in Example 1 and Example 2, the treatment for imparting hydrophobicity to the surface of active carbon enables the amount of an organochlorine compound adsorbed on the active carbon (adsorption coefficient κ) to be increased from not more than 100, the magnitude before the treatment, to not less than 210, the magnitude after the treatment. The surface hydrophobic active carbon, when used as an adsorbent, exhibits a high capacity for the adsorption of an organochlorine compound contained in groundwater and purifies polluted water with high efficiency.

What is claimed is:

1. A method for the production of a surface hydrophobic active carbon, which comprises charging a decompressed tightly sealed container with active carbon and trimethyl chlorosilane, exposing said active carbon to said trimethyl chlorosilane in the form of vapor, decompressing the interior of the container below 0.1 torr. and heating at a temperature in the range of 80°–150° C. said active carbon in the decompressed state; wherein said surface hydrophobic carbon exhibits a silicon concentration on the surface thereof, $Si_{2p}/C_{1s}$, in the range of 0.005–0.03 as determined by X-ray photoelectron spectroscopy and a humidity for starting adsorption of water in the range of 45–60% as determined from the equilibrium absorbed water content curve.

2. The method according to claim 1, wherein said active carbon is carbon fibers.

3. A method for the production of a surface hydrophobic active carbon, which comprises charging a container with a solution comprising trimethyl chlorosilane and an oleophilie solvent, immersing active carbon in the resultant solution thereby establishing contact between trimethyl chlorosilane and said active carbon, separating said active carbon from said solution, decompressing the interior of the container below 0.1 torr, and heating said active carbon at a temperature in the range of 80°–150° C. in the decompressed state; wherein said surface hydrophobic carbon exhibits a silicon concentration on the surface thereof, $Si_{2p}/C_{1s}$, in the range of 0.005–0.03 as determined by X-ray photoelectron spectroscopy and a humidity for starting absorption of water in the range of 45–60% as determined from the equilibrium absorbed water content curve.

4. The method according to claim 3, wherein said active carbon is carbon fibers.

\* \* \* \* \*

UNITED STATES PATENT AND TRADEMARK OFFICE
CERTIFICATE OF CORRECTION

PATENT NO. : 5,837,644
DATED : November 17, 1998
INVENTOR(S) : Yoichiro NAKANISHI et al.

It is certified that error appears in the above-identified patent and that said Letters Patent is hereby corrected as shown below:

On the title page, item [73], the Assignee information should be:

--Agency of Industrial Science & Technology, Ministry of International Trade & Industry, Tokyo, Japan--

Signed and Sealed this

Sixth Day of July, 1999

Attest:

Q. TODD DICKINSON

*Attesting Officer*  *Acting Commissioner of Patents and Trademarks*